G. N. Cummings,
Making Spectacles,
Nº 18,194.  Patented Sep. 15, 1857.

UNITED STATES PATENT OFFICE.

GEO. N. CUMMINGS, OF HARTFORD, CONNECTICUT.

MACHINE FOR EXPANDING SPECTACLE-BOWS.

Specification of Letters Patent No. 18,194, dated September 15, 1857.

*To all whom it may concern:*

Be it known that I, GEORGE N. CUMMINGS, of the city of Hartford, county of Hartford and State of Connecticut, have invented a new and useful Machine for Manufacturing Spectacle-Eyes; and I do hereby declare that the following is a correct description thereof, reference also being had to the accompanying drawing and to the letters of reference marked thereon.

The nature of my invention consists in the construction and operation of expanding jaw, or, jaws, to finish forming the metallic rim of spectacle eyes.

To enable others skilled in the art to make and use my invention I will proceed to describe its construction and operation.

Figure 2:
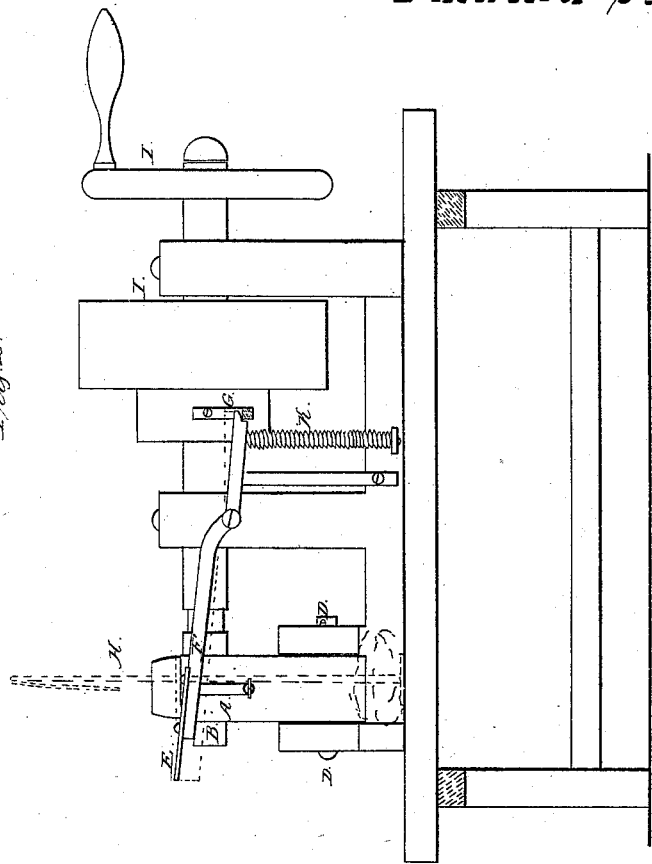
Figure 1:
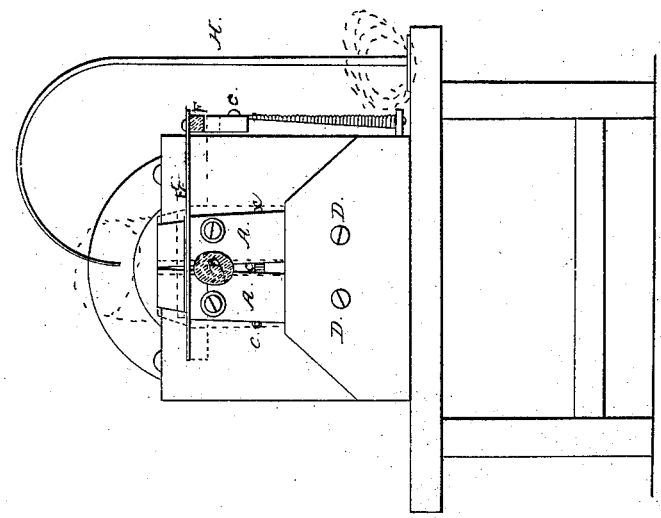

The drawing Figure 1 is a front view of the jaws, &c. Fig. 2 is side view.

The mechanical construction of my machine is shown in the drawing Figs. 1 and 2.

A A are the expanding jaws, vibrating on the centers D D, made of any suitable size or shape required for the spectacle eye rim.

B is the oval or cam shaft passing between the jaws A, which when rotating causes the said jaws to separate and expand the distance required, and are closed again by the reaction of the coiled spring C or its equivalent.

E is the movable platform to place the partly formed eye rim upon to be stretched and shaped by the expanding jaws A.

F is the lever to actuate the platform E to throw off the eyes after being stretched to the finished shape.

G the adjustable lever arm to rotate and strike the end of the lever F upward, and when it leaves it the coiled spring K, causes a quick recoil of the platform, which throws the finished eye upon the curved rod H.

This curved rod H is made of any suitable length to receive as many eyes as desired. The crank and pulleys I I actuate the whole.

To operate this machine, a partly formed eye rim which is made smaller than when finished is placed upon the platform E, over the top of the jaws A when closed; then revolve the crank shaft B. The jaws will open by the action of the cam or oval part of the shaft B between the jaws, and stretch the eye rim to its proper size and shape uniform and correct. The jaws then close by the reaction of the coiled spring C or other device leaving the eye loose upon the platform E one of the rotating arms G, then strikes the end of the lever F, propelling the platform E a distance downward, which being suddenly relieved after the arm G leaves the end of the lever F, the reaction of the coiled spring K propels the eye from the platform on to the curved rod H, the jaws remaining closed time enough to receive another eye to be operated upon.

The usual method of forming the rims of spectacle eyes, has been to beat them on a mandrel with a small wooden mallet to the proper size and shape, a tedious and not a very perfect operation. My method as herein described for finishing them on the expanding jaws, gives them a perfectly even uniform shape and size and this method of stretching them increases the hardness and firmness of the metal which is a very desirable and economical improvement.

What I claim as my invention and desire to secure by Letters Patent is—

The spectacle eye former, made in two parts as herein described, the circumference of the two parts, when closed being smaller than the eye, and being expanded by the double former to the required size, in the manner and for the purpose as herein set forth.

G. N. CUMMINGS.

Witnesses:
WM. VINE,
N. SHIPMAN.